United States Patent [19]

Meaden et al.

[11] 4,402,519
[45] Sep. 6, 1983

[54] TOOL CONNECTOR

[76] Inventors: Thomas F. Meaden; Domingo Hinojosa, both c/o Meaden Screw Products Company, 210 W. 83rd St., Burr Ridge, Ill. 60521

[21] Appl. No.: 166,083
[22] Filed: Jul. 3, 1980
[51] Int. Cl.³ .................. B23B 31/12; F16B 21/00
[52] U.S. Cl. ...................... 279/76; 403/324
[58] Field of Search ............ 403/316, 324; 409/234; 279/6, 19.5, 76, 77, 86, 89, 97, 91

[56] References Cited

U.S. PATENT DOCUMENTS

| | | | |
|---|---|---|---|
| 95,060 | 9/1969 | Winkelhouse | 279/91 |
| 1,509,823 | 6/1931 | Altvater | 279/97 |
| 1,785,495 | 12/1930 | Richard | 279/97 |
| 1,809,553 | 6/1931 | Graul | 279/89 |
| 1,833,236 | 11/1931 | Smith | 279/19.5 |
| 2,350,565 | 6/1944 | Mills | 279/76 |
| 2,485,799 | 10/1949 | Woytych | 279/76 |
| 2,667,357 | 1/1954 | Andreasson | 279/86 |
| 2,719,722 | 10/1955 | Nickless | 279/91 |
| 2,727,748 | 12/1955 | Benjamin | 4/650 |
| 2,768,831 | 10/1956 | Bellmann | 279/6 |
| 2,781,199 | 2/1957 | Veldhuizen | 279/777 |
| 2,816,770 | 12/1957 | De Vlieg | 279/97 |
| 3,685,865 | 8/1972 | Young | 403/316 |
| 3,884,120 | 5/1975 | Diferdimando | 409/234 |
| 3,954,276 | 5/1976 | Koniger | 279/97 |
| 4,092,074 | 5/1978 | Harper | 403/316 |
| 4,113,221 | 9/1978 | Wehner | 403/324 |
| 4,146,240 | 3/1979 | Nielsen | 279/97 |
| 4,185,935 | 1/1980 | Bierlein | 403/316 |

Primary Examiner—Robert E. Garrett
Assistant Examiner—Paul M. Heyrana, Sr.
Attorney, Agent, or Firm—Wood, Dalton, Phillips, Mason & Rowe

[57] ABSTRACT

A quick-connect tooling system for releasably locking a tool to a spindle. The tooling system includes a rotatable collar mounted on the spindle and having a chordal through bore aligned with a U-shaped chordal transverse groove in the end of the spindle intersecting the axial bore thereof. A manually operable lock is received in the collar bore and spindle U-shaped groove so as to intersect a recess in the tool holder provided adjacent the inner end thereof so as to provide locking shoulders engaging a locking shoulder on the tool holder in retaining the tool holder in the tooling system. Additional shoulders are provided on the lock and spindle for retaining the lock in a released position for facilitating the insertion and removal of the tool holder relative to the spindle. The system is arranged so as to engage the retaining shoulders as an incident of urging of the lock to the release position, the collar being concurrently rotated to permit such disposition of the retaining shoulders. Manual reverse rotation of the collar after the tool holder is inserted into the spindle releases the retaining shoulders and engages the tool holder locking shoulders to provide the desired retention of the tool holder in the system.

11 Claims, 7 Drawing Figures

TOOL CONNECTOR

BACKGROUND OF THE INVENTION

1. Field of the Invention

This invention relates to tooling systems and in particular to quick-connect tooling systems such as for use in providing readily releasable mounting of tool holders in association with machine tools.

2. Description of the Prior Art

It is desirable in tooling systems to provide means for efficiently mounting a tool to a drive spindle of the machine. A number of different devices have been developed over the years to provide such mounting.

Illustratively, in U.S. Pat. Ser. No. 95,060 of J. Winkelhouse, a bit stock is shown for use with a socket having a hole drilled therethrough with a bolt provided with a notch being selectively positioned so that when the bit is in the socket, it will be held there by the spring secured to the bolt.

Clement C. Richard, in U.S. Pat. Ser. No. 1,785,495, shows a punch and die retainer wherein the punch or die is locked in the retainer by a rotatable lock member.

Herman M. Graul shows, in U.S. Pat. Ser. No. 1,809,553, a tool holder having a holder member provided with a tool receiving aperture and a yieldable pin positioned in the walls of the holder member with the central portion of the pin being turned down and spaced from the walls of the tool holder. The tool is rotatable to press a portion of the pin out of alignment with the normal axis thereof to permit the tool to be moved in positive locking position.

George W. Smith, in U.S. Pat. Ser. No. 1,833,236, shows a tool retainer having a bolt which, when pushed in, may be turned to bring a pin into a shallow groove so that a concave groove will be out of alignment with a collar, permitting the bolt to hold the tool in place.

In U.S. Pat. Ser. No. 1,809,823, Arthur W. Altvater shows a cutting or ornamenting die having a holder for the die provided with a latching device adapted to engage with portions of the die to hold the die in fixed relationship to the holder while permitting ready removal thereof when desired.

An improved toolhead is shown by Raymond M. Woytych in U.S. Pat. Ser. No. 2,485,799 to include a head of the type adapted to be removably received and support the taper shank of a rotary tool holder. The toolhead includes a floating cam unit which is reversibly operable selectively to tighten and lock the taper shank of the tool holder accurately in centered position or to release and partially eject the shank so as to insure breaking of any wedge lock between the taper surfaces preparatory to removal of the shank from the tool holder.

Allen E. Nickless shows a quick change tool holder in U.S. Pat. Ser. No. 2,719,722 wherein a locking ring is arranged to be rotated so as to cause a pair of pins to engage whereby notches will be positioned in alignment with each other permitting the tool holder to be thrust into the bore of the device with the lugs thereof passing through the notches so as to be aligned with a groove. A subsequent clockwise threading of the nut draws a member inwardly into the supporting member so as to secure it in the bore to prevent rotation.

A quick-change chuck is shown by Milton L. Benjamin et al, in U.S. Pat. Ser. No. 2,727,748, having a nonrotatable keying element disposed relatively far from the axis of the tool mounting member so as to reduce torque stresses thereon. The tool mounting member is of conventional form, including a tapered shank terminating in a collar or flange which is radially slotted for engagement with corresponding keys or blocks of the spindle adapter on the machine spindle.

Reinhold Bellmann, in U.S. Pat. Ser. No. 2,768,831, shows a holding device for tools having two parts, one of which encloses the other so as to guarantee rigidity in the assembly.

Frank L. Diferdinando shows a milling machine cutting adapter, in U.S. Pat. Ser. No. 3,884,120, which is arranged to mount both end and face milling cutters one at a time on the drive spindle of a milling machine without removing the adapter from the drive spindle.

In U.S. Pat. Ser. No. 2,433,127, Robert B. Kinzbach shows a machine tool holder having interlocking means carried by the holder whereby the shank of the tool may be readily locked in the holder in exact axial alignment therewith while permitting ready releasability when desired. The tool shank has a frustoconical shaped portion adapted to fit closely into the socket of the tool holder and a cam member is provided for drawing the conical portion of the shank inwardly against the wall of the socket.

In U.S. Pat. Ser. No. 3,954,276, Rudolf Koniger et al show an impact device having a locking stud which is arrested in a tool-locking position and which is operated to release the stud to permit it to be moved out of the tool-locking position when desired.

SUMMARY OF THE INVENTION

The present invention comprehends an improved quick-connect tooling system wherein a tool holder is mounted to a machine tool spindle by an improved releasable locking structure including a manually operable locking collar rotatably carried on the end of the spindle and carrying a manually operable lock.

The lock is arranged so as to maintain itself in a released position as an incident of an urging thereof against integral biasing means. As a concurrent operation of the lock release, the collar is rotated to a first angular position permitting the retaining means of the device to maintain the system in the released arrangement, thereby permitting facilitated insertion and removal of the tool holder into the spindle.

The system is brought back to the locking position by simple rotation of the collar from the first angular position to a second angular position wherein the lock is suitably positioned for locking engagement with a locking shoulder on the tool holder. The biasing means automatically brings the lock to the locking disposition as a result of the manual rotation of the collar from the first angular position.

The tooling system structure of the present invention is extremely simple and economical of construction while yet providing an improved facilitated mounting and removal of the tool holder relative to the spindle.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 2:
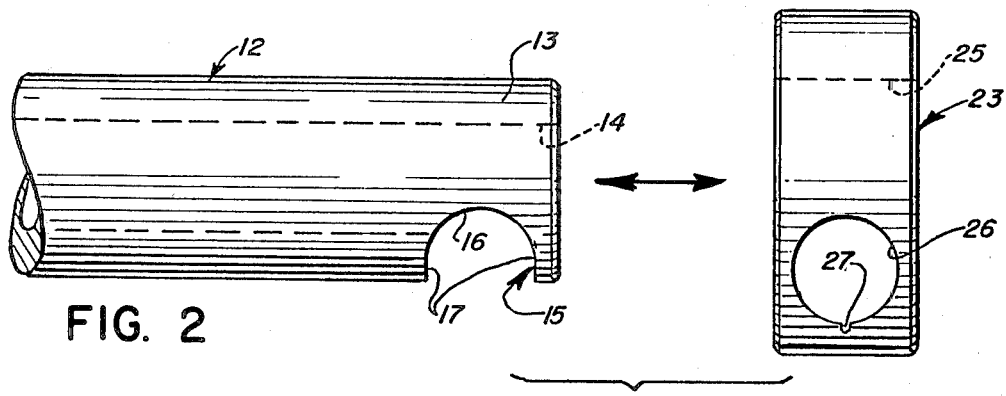
FIG. 2 is a fragmentary side elevation of the spindle and collar elements of the tooling system.

In the exemplary embodiment of the invention as disclosed in the drawing, a quick-connect tooling system generally designated 10 is provided for releasably locking a tool, such as drill 11, to a machine tool spindle 12 having a cylindrical outer end 13 defining an axially outwardly opening bore 14 and a radially outwardly opening U-shaped groove 15 intersecting bore 14, as best seen in FIG. 2. As shown therein, the groove is defined by circular end portions 16 and straight side portions 17.

Figure 1:
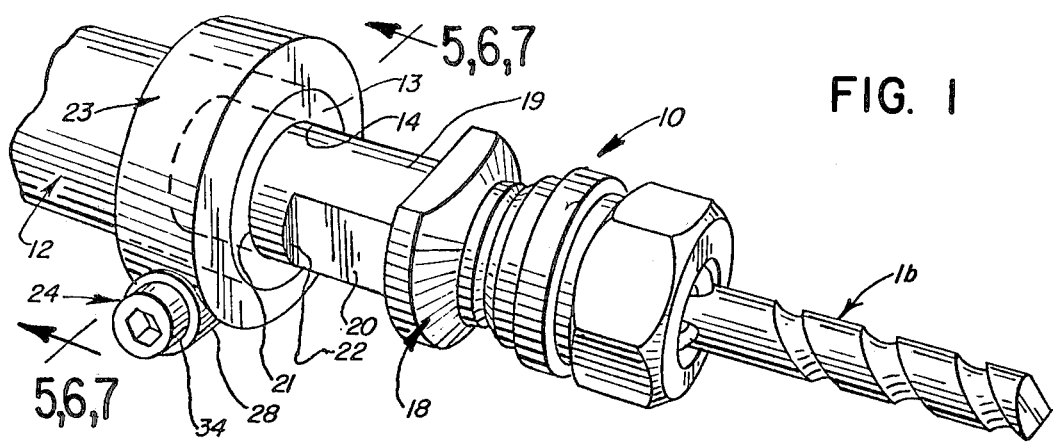
FIG. 1 is a fragmentary isometric view of a quick-connect tooling system embodying the invention.

As shown in FIG. 1, tool 11 may be mounted in a tool holder generally designated 18 having a cylindrical connecting portion, or shank, 19 provided with a chordal radially outwardly opening flat recess 20 spaced outwardly from an inner end 21 of the tool holder portion 19 and defining at its inner end a locking surface 22. The locking surface may define a flat, angularly inwardly inclined surface, as illustrated in FIG. 1.

The cylindrical end 19 of the tool holder is adapted to be slidably received in the bore 14 of spindle end 13 so as to bring the recess 20 in alignment with the groove 15 in an installed disposition. The tool holder is releasably retained in the installed disposition by new and improved means forming a portion of tooling system 10 including an annular collar generally designated 23 and a lock generally designated 24. The annular collar defines a through bore 25 having a diameter preselected to permit slidable rotative mounting of the collar on the spindle end 13. The collar further is provided with a chordal cylindrical through bore 26 provided at one end with a notch 27. Bore 26 has a diameter substantially equal to the diameter of the rounded end 16 of the groove 15 and is disposed so as to be coaxially aligned therewith when the collar is installed, substantially flush with the end portion 13 of the spindle, as illustrated in FIG. 1.

Figure 3:
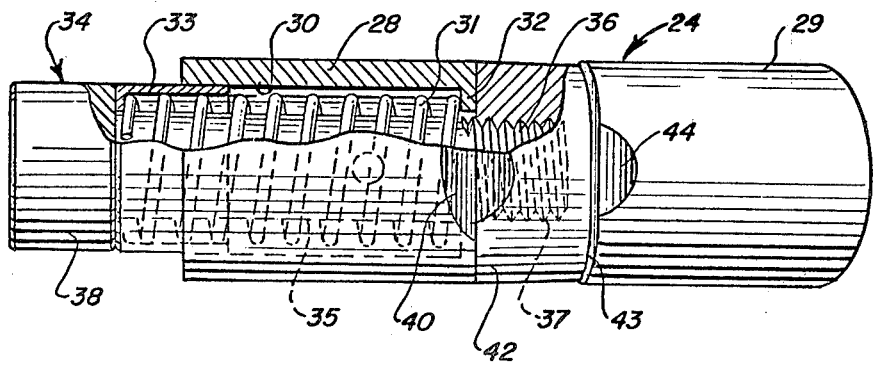
FIG. 3 is a top plan view of the lock means of the tooling system with portions broken away to facilitate illustration of the construction thereof.
Figure 4:
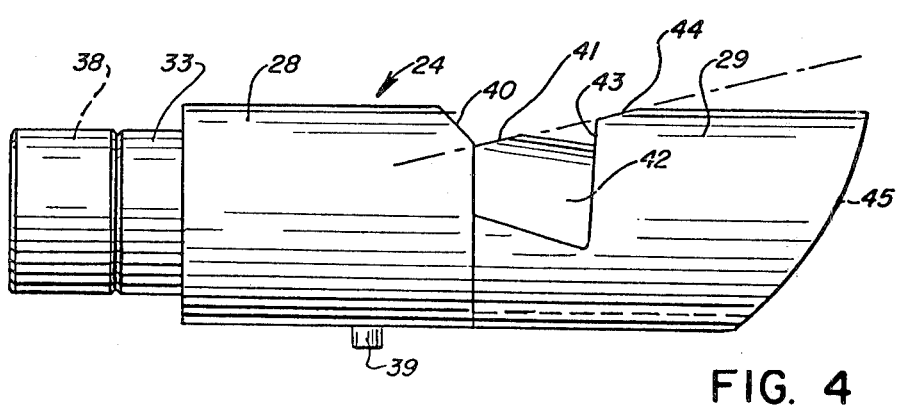
FIG. 4 is a side elevation of the lock.

Lock 24, as illustrated in FIGS. 3 and 4, comprises a generally cylindrical device including a first cylindrical portion 28 and a second cylindrical portion 29. First lock portion 28 is provided with an outwardly opening cylindrical recess 30 in which is received a coil spring 31 bottoming against an annular flange 32 at the inner end of the first lock portion 28. The outer end of the spring is received in a cup-shaped retainer 33 and a retaining screw generally designated 34 is provided with a cylindrical stem 35 extending coaxially through the recess 30 and spring 31 to have a threaded inner end 36 of the screw threadedly received in a complementary threaded recess 37 of the second lock member 29, as shown in FIG. 3. The head 38 of the screw bears against the cup-shaped retainer 33 and maintains spring 31 under compression within recess 30, thereby urging the first and second lock portions 28 and 29 together to a locking position, as shown therein.

As shown in FIG. 4, first lock portion 28 may be provided with a radially projecting pin 39. The pin is adapted to be received in the notch 27 when the cylindrical lock is installed coaxially through the aligned power bore 26 and spindle groove 16, as illustrated in FIG. 1.

As further shown in FIG. 4, first lock portion 28 is provided at its inner end with a chamfer surface 40. The second lock portion 29 is provided with a complementary chamfer end surface 41 in a conical recess 42 at the inner end of portion 29, as seen in FIG. 4. As shown, recess 42 narrows outwardly, or to the left, ending in an arcuate transverse shoulder 43. A chamfer surface 44 is provided at the outer end of transverse surface 43 so as to be coplanar with chamfer surface 41, as shown in FIG. 4. The outer end 45 of the lock portion 29 may be cylindrically rounded so as to be substantially flush with collar 23 when the lock is installed in the tooling system 10 and in the locking position illustrated in FIG. 7.

Figure 7:
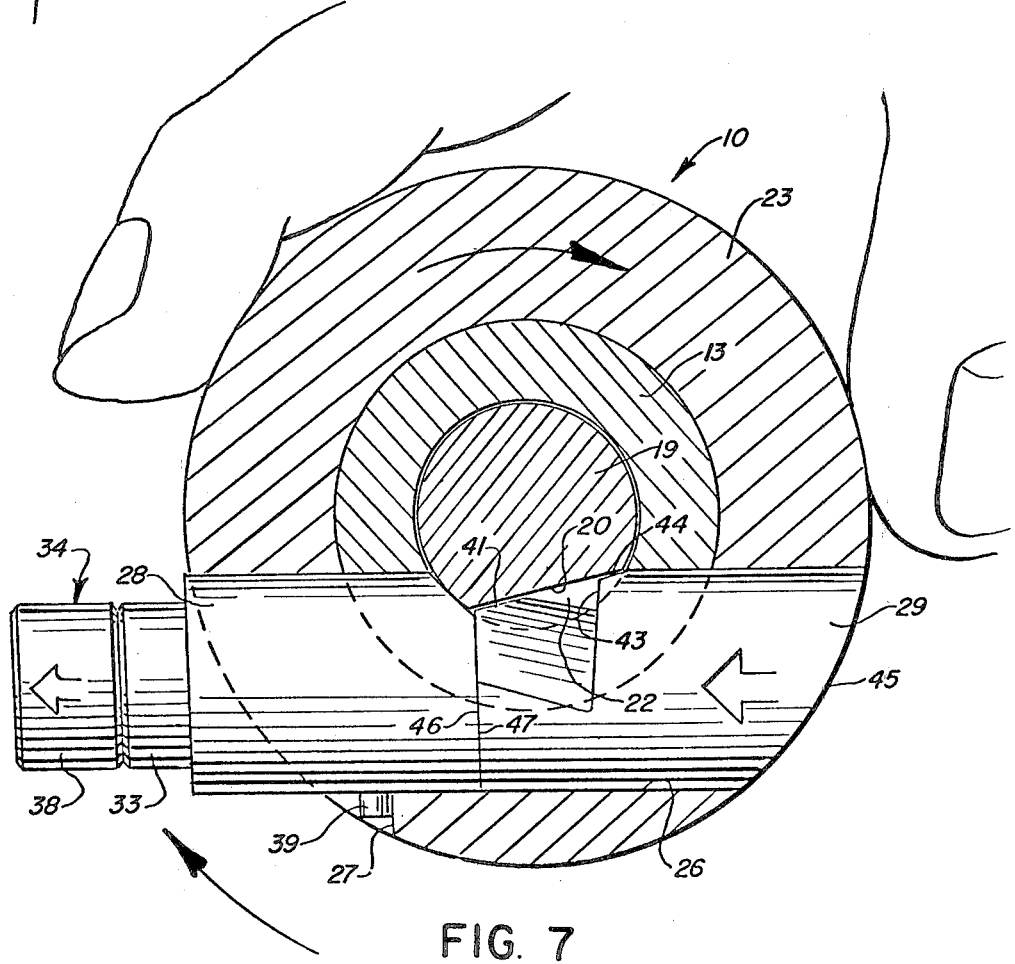
FIG. 7 is an enlarged diametric section taken substantially along the line 7—7 of FIG. 1 illustrating the step of rotating the collar to effect a locking of the tool holder in the tooling system.

In the locking position of FIG. 7, the inner end surface 46 of lock portion 29 is urged into abutment with the confronting end surface 47 of the lock portion 28.

Figure 5:
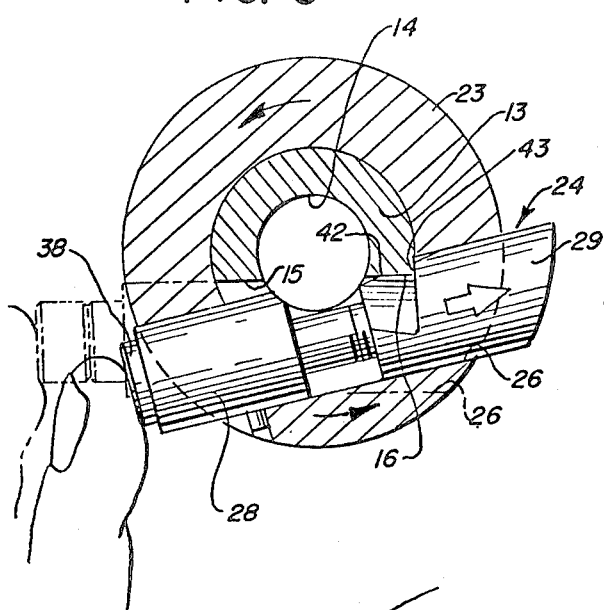
FIG. 5 is a transverse section taken substantially along the line 5—5 of FIG. 1 illustrating the adjustment of the tooling system from a locking position to a released position.

As shown in FIG. 5, when it is desired to arrange lock 24 so as to permit installation of the tool holder shank 19 in spindle 12, the collar is rotated in a counterclockwise direction by urging the lock in a counterclockwise direction in the collar bore 26 and spindle groove 16. To effect such movement, the user merely presses against the screw head 38, as illustrated in FIG. 5. Such urging causes collar 23 to rotate on spindle end 13 sufficiently to bring the frustoconical surface of recess 42 into abutment with the spindle groove end 16 and the stop shoulder 43 in facial juxtaposition to the outer surface of the spindle end 13. During such urging, the lock portion 28 is retained against axial movement through the bore end groove by the pin 39 received in notch 27, as illustrated in FIG. 5, so that second portion 29 of the lock is moved away from the first portion to the retaining position of FIG. 5.

Figure 6:
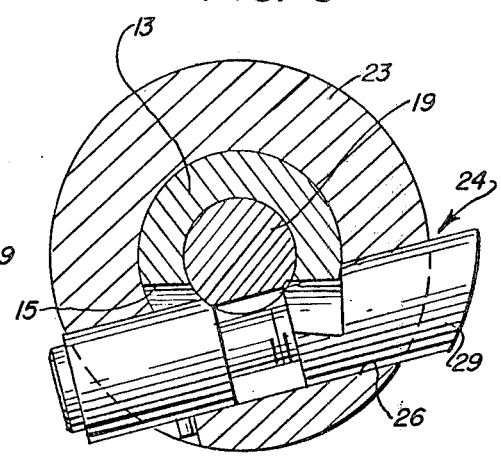
FIG. 6 is a transverse section taken along the line 6—6 of FIG. 1 illustrating the insertion of the tool holder end into the spindle with the lock in the released position.

In the retaining position, bore 14 of the spindle is fully accessible from the outer end thereof, as illustrated in FIG. 5, so as to permit insertion of the cylindrical end 19 of the tool holder, as illustrated in FIG. 6. As shown in FIG. 6, the tool holder recess 20 is disposed so as to be generally parallel to the axial extent of the lock 24 when so inserted.

To lock the tool holder shank 19 in the spindle, the operator then need merely rotate collar 23 in a clockwise direction, as illustrated in FIG. 7, to bring the lock in coaxial alignment with the spindle groove 15, thereby permitting the second lock portion 29 to be urged back to the locking position of FIG. 7 by the biasing spring 31, the locking position being determined by the abutment of surfaces 46 and 47, as shown. In the locking position, the flat surface 20 of the tool holder shank is facially aligned with the chamfer surfaces 41 and 44 of the lock portion 29 whereby the lock surface 22 of the tool holder shank 19 is retained inwardly of the lock portion 29, or behind the chamfered surfaces 41 and 44, as seen in FIG. 7. Thus, the tool holder is effectively locked to the spindle in a quick-connect manner by the above discussed simple manipulations of the tool-holding system.

To release the tool holder when desired, the user need merely again press inwardly on the screwhead 38 to concurrently move the lock portion 29 away from lock portion 28 and rotate collar 23 in a counterclockwise direction so as to arrange the lock once again in the released disposition of FIG. 5, whereupon the cylindrical shank portion 19 of the tool holder may be readily axially withdrawn from the spindle. Upon withdrawal of the tool holder shank, the lock is effectively retained in the released disposition of FIG. 5 so as to be arranged for subsequent insertion of the same or a different tool holder in the same manner as discussed above.

Thus, the tool system of the present invention is extremely simple and economical of construction while yet providing the highly desirable, simplified and facilitated installation and removal functioning as discussed above. The simplicity of the design assures long, troublefree life while yet providing a positive locking of the tool holder in the system, when desired.

The foregoing disclosure of specific embodiments is illustrative of the broad inventive concepts comprehended by the invention.

I claim:

1. A quick-connect tooling system for releasably locking a tool to a spindle having a cylindrical outer end defining an axially outwardly opening cylindrical bore and a radially outwardly opening U-shaped groove chordally intersecting said bore, said tooling system comprising:

a tool holder having a cylindrical connecting portion provided with a chordal radially outwardly opening recess spaced from an inner end of the tool holder and said recess defining at its inner end a locking surface, said tool holder inner end being coaxially receivable in said spindle bore with said chordal recess intersecting said spindle groove;

an annular locking collar coaxially rotatively mounted on said spindle outer end about said recess, said collar having a chordal cylindrical through bore axially aligned with said spindle groove;

a lock received in said collar bore and said spindle U-shaped groove intersecting said tool holder recess when said tool holder connecting portion is mounted into said spindle outer end, said lock including first and second axially aligned portions, means biasing said portions toward each other to a locking position, shoulder means on at least one of said portions for engaging said tool holder locking surface when the portions are in said locking position to releasably lock the tool holder to the spindle;

displacing means for selectively displacing said shoulder means from said locking position against the action of said biasing means to a released position wherein said shoulder means is displaced from said spindle bore; and retaining means for selectively retaining said shoulder means in said released position to permit insertion and removal of the tool holder from said spindle as desired.

2. The quick-connect tooling system of claim 1 wherein said retaining means comprises cooperating shoulders on said spindle and lock.

3. The quick-connect tooling system of claim 1 wherein said displacing means comprises means for urging said second portion of said lock away from said first portion, and said retaining means comprises cooperating shoulders on said spindle and said second portion of the lock.

4. The quick-connect tooling system of claim 1 wherein said retaining means comprises cooperating shoulders on said spindle and lock, and said biasing means urging said cooperating shoulders on said spindle and lock to engaged relationship.

5. The quick-connect tooling system of claim 1 wherein said retaining means comprises means releasable as an incident of rotation of said collar on said spindle outer end to permit said biasing means to restore said first and second lock portions to said locking position.

6. The quick-connect tooling system of claim 1 wherein said lock shoulder means comprises spaced shoulders on one of said lock portions.

7. The quick-connect tooling system of claim 1 wherein said lock and collar define cooperating stop shoulders for limiting the movement of said lock inwardly relative to said collar bore.

8. The quick-connect tooling system of claim 1 wherein said first and second lock portions define stop surfaces arranged to be in abutment when the lock is in said locking position.

9. The quick-connect tooling system of claim 1 wherein said biasing means comprises a helical spring carried by one of said lock portions, and a control member carried by the other of said lock portions and having a stem extending axially through said spring and a head abutting the distal end of the spring to maintain the spring under compression.

10. The quick-connect tooling system of claim 1 wherein said displacing means further comprises means for causing rotation of said collar on said spindle to a first angular position wherein said retaining means is operative to retain said shoulder means in said released position, said collar being manually reversely rotatable from said first angular position to a second angular position to release said retaining means and permit said biasing means to restore said shoulder means to said locking position.

11. The quick-connect tooling system of claim 1 wherein said displacing means further comprises means for causing, as an incident of an urging of said lock to said released position by said displacing means, rotation of said collar on said spindle to a first angular position wherein said retaining means is operative to retain said shoulder means in said released position, said collar being manually reversely rotatable from said first angular position to a second angular position to release said retaining means and permit said biasing means to restore said shoulder means to said locking position.

* * * * *